US006938588B2

(12) United States Patent
Jacobsen et al.

(10) Patent No.: US 6,938,588 B2
(45) Date of Patent: Sep. 6, 2005

(54) CONTROLLABLE COMBUSTION METHOD AND DEVICE

(75) Inventors: Stephen C. Jacobsen, Salt Lake City, UT (US); Marc Olivier, Salt Lake City, UT (US); Clark C. Davis, Salt Lake City, UT (US)

(73) Assignee: Sarcos Investments, LC, Salt Lake City, UT (US)

( * ) Notice: Subject to any disclaimer, the term of this patent is extended or adjusted under 35 U.S.C. 154(b) by 126 days.

(21) Appl. No.: 10/128,988

(22) Filed: Apr. 23, 2002

(65) Prior Publication Data

US 2003/0108830 A1 Jun. 12, 2003

Related U.S. Application Data

(63) Continuation-in-part of application No. 09/439,473, filed on Nov. 12, 1999, now Pat. No. 6,375,454.
(60) Provisional application No. 60/303,053, filed on Jul. 5, 2001.

(51) Int. Cl.$^7$ ............................................... F02B 75/00
(52) U.S. Cl. .................. 123/46 R; 123/659; 123/429; 123/52.1; 123/305; 60/39.6
(58) Field of Search ............................ 123/41.69, 550, 123/46 R, 659, 429, 653, 647, 533, 294, 660, 52.1, 305; 60/39.6

(56) References Cited

U.S. PATENT DOCUMENTS

| 1,788,140 A | * | 1/1931 | Woolson ................ 123/51 AA |
| 1,914,940 A | * | 6/1933 | Chilton ...................... 165/177 |
| 1,983,405 A | | 12/1934 | Schmidt |
| 2,525,782 A | | 10/1950 | Dunbar |
| 2,539,535 A | | 1/1951 | Espenschied |
| 2,549,464 A | | 4/1951 | Hartley |
| 2,573,697 A | | 11/1951 | Dunbar et al. |
| 2,581,669 A | | 1/1952 | Kadenacy |
| 2,647,365 A | | 8/1953 | Myers |
| 2,838,102 A | | 6/1958 | Reimers |
| 3,093,962 A | | 6/1963 | Gluhareff |
| 3,395,967 A | | 8/1968 | Karr |
| 3,545,211 A | | 12/1970 | Harp, Jr. |
| 3,644,069 A | * | 2/1972 | Stewart .................... 123/18 A |
| 3,868,931 A | * | 3/1975 | Dutry et al. .............. 123/51 R |
| 3,954,380 A | | 5/1976 | Valaev et al. |
| 4,907,549 A | * | 3/1990 | Morikawa et al. .......... 123/561 |
| 5,000,677 A | * | 3/1991 | Lathion et al. |
| 5,123,835 A | | 6/1992 | Richards et al. |
| 5,302,112 A | * | 4/1994 | Nabors, Jr. et al. |
| 5,322,043 A | * | 6/1994 | Shriner et al. ............. 123/295 |
| 6,105,553 A | * | 8/2000 | Polach ....................... 123/435 |

OTHER PUBLICATIONS

Borman, G. and Ragland, K., Combustion Engineering, Boston, WCB McGraw–Hill, 1998, p. 25.*
Turns, S., An Introduction to Combustion. N.Y., McGraw–Hill Inc., 1996. p. 6.*

* cited by examiner

Primary Examiner—Sara Clarke
(74) Attorney, Agent, or Firm—Thorpe North & Western LLP

(57) ABSTRACT

A method and device for controllably combusting combustible material, including a combustion device comprising an elongate combustion tube having an inlet section including an inlet for combustible material, an ignition section, including an igniter displaced along a length of the tube from the inlet section to ignite the combustible material, and at least one energy extraction device operatively coupled to the combustion tube and configured to extract energy from combustion of the combustible mixture.

41 Claims, 17 Drawing Sheets

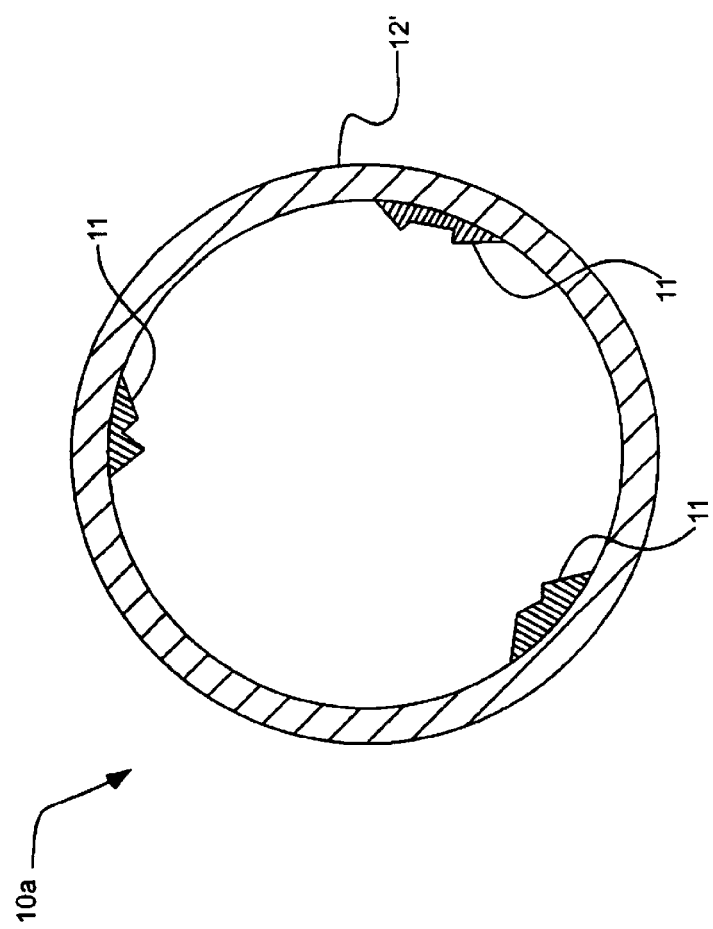

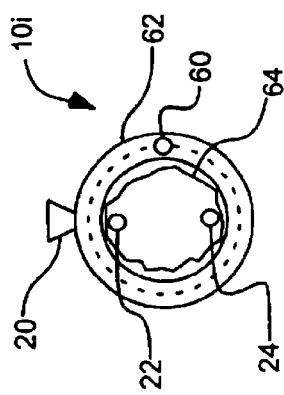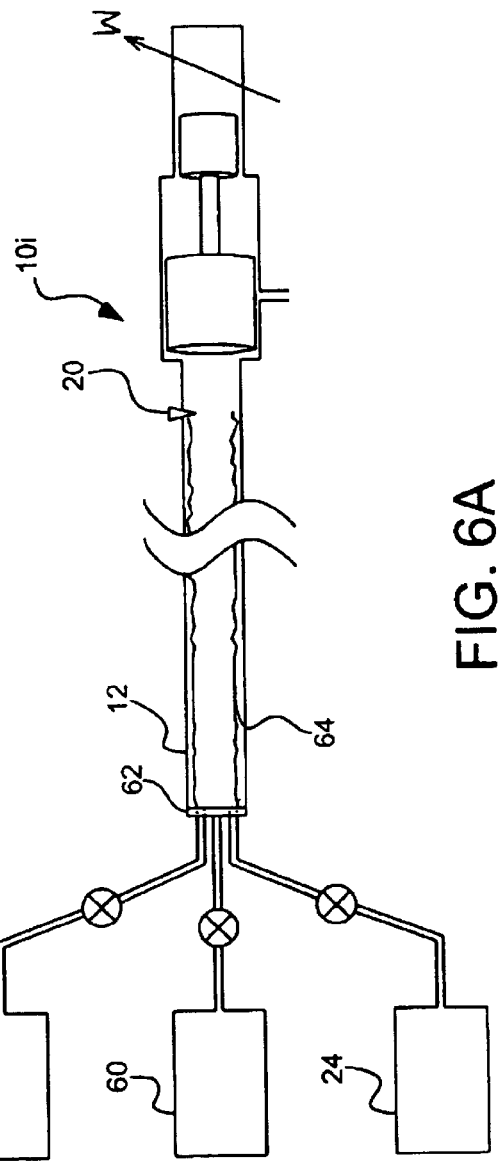
FIG. 6B
FIG. 6A

CONTROLLABLE COMBUSTION METHOD AND DEVICE

This application is a continuation-in-part of U.S. patent application Ser. No. 09/439,473, filed Nov. 12, 1999 now U.S. Pat. No. 6,375,454, and claims priority to U.S. Provisional Patent Application No. 60/303,053, filed Jul. 5, 2001.

BACKGROUND OF THE INVENTION

1. Field of the Invention

The present invention relates generally to a combustion device and more particularly to a lightweight, high bandwidth, controllable combustion device that can be used to power a variety of power sources.

2. Related Art

Power sources that directly convert combustible materials into usable energy have been used for many years in a variety of applications including motor vehicles, electric generators, hydraulic pumps, etc. Perhaps the best known example of such a power source is the internal combustion engine, which converts fossil fuel into rotational power. Internal combustion engines are used by almost all motorized vehicles and many other energetically autonomous devices such as lawn mowers, chain saws, and emergency electric generators. However, conventional internal combustion engines are problematic in that they can produce a high degree of pollutants and can be very inefficient. The inefficiency of most internal combustion engines is due to the fact that a great deal of energy produced by combustion is lost as heat, energy which would otherwise be converted in to useful work. More efficient internal combustion engines have been developed but usually at a cost of greatly increasing the weight of the engine to minimize heat loss.

Furthermore, conventional internal combustion engines have not been successfully used independently in many applications because of their relatively slow response characteristics. This limitation is particularly problematic in powering robotic devices and similar systems which utilize a feedback loop to perform real time adjustments in movements of the mechanical structure. Typically, the power source in such a system must be able to generate power output which quickly applies corrective signals to power output as necessary to maintain proper operation of the mechanical device.

The response speed, or bandwidth, of a power source within a mechanical system is an indication of how quickly the energy produced by the source can be accessed by an application. An example of a rapid response, or high bandwidth, power system is a hydraulic pressure system. In a hydraulic system, energy from any number of sources can be used to pressurize hydraulic fluid and store the pressurized fluid in an accumulator. The energy contained in the pressurized fluid can be accessed almost instantaneously by opening a valve, often a servo-valve, in the system and releasing the fluid to perform some kind of work, such as extending or retracting a hydraulic actuator. The response time of this type of hydraulic system is very rapid, on the order of a few milliseconds or less.

As an example of the problems associated with low bandwidth internal combustion engines, consider the response rate of a conventional automobile. The accelerator on a vehicle equipped with an internal combustion engine controls the rotational speed of the engine, measured in revolutions per minute ("rpms"). When power is desired the accelerator is activated and the engine increases its rotational speed accordingly. But the engine cannot reach the desired change in a very rapid fashion due to inertial forces internal to the engine and the nature of the combustion process. If the maximum rotational output of an engine is 7000 rpms, then the time it takes for the engine to go from 0 to 7000 rpms is a measure of the response time of the engine, which can be a few seconds or more. Moreover, if it is attempted to operate the engine repeatedly in a rapid cycle from 0 to 7000 rpms and back to 0 rpms, the response time of the engine slows even further as the engine attempts to respond to the cyclic signal. In contrast, a hydraulic cylinder can be actuated in a matter of milliseconds or less, and can be operated in a rapid cycle without compromising its fast response time.

For this reason, many applications utilizing high bandwidth mechanisms require that the energy produced by a primary power source be stored in another, higher bandwidth energy system which holds energy in reserve so that the energy can be accessed nearly instantaneously. One example of such an application is heavy earth moving equipment, such as backhoes and front-end loaders, which utilize the hydraulic pressure system discussed above. Heavy equipment is generally powered by an internal combustion engine, usually a diesel engine, which supplies ample power for the operation of the equipment, but is incapable of meeting the energy response requirements of the various components. By storing and amplifying the power from the internal combustion engine in the hydraulic system, the heavy equipment is capable of producing great force with very accurate control. However, this versatility comes at a cost. In order for a system to be energetically autonomous and be capable of precise control, more components must be added to the system, increasing weight and cost of operation of the system. As modern technology moves into miniaturization of devices, the extra weight and volume of the power source and its attendant conversion hardware are becoming major hurdles against meaningful progress.

The complications inherent in using a low bandwidth power source such as a conventional internal combustion engine to power a high bandwidth source become increasingly problematic in applications such as robotics. In order for a robot to accurately mimic human movements, the robot must be capable of making precise, controlled, and timely movements. This level of control requires a rapid response system such as the hydraulic system discussed above, or an electrical system. Because these rapid response systems require power from some primary power source, the robot must either be part of a larger system that supplies power to the rapid response system or the robot must be directly fitted with heavy primary power sources or electric storage devices. Ideally, however, robots and other applications should be energetically autonomous, with minimal weight and not tethered to a power source with hydraulic or electric supply lines. To date, however, technology has struggled to realize this combination of rapid response, minimal weight, effective control, and autonomy of operation.

SUMMARY OF THE INVENTION

It has been recognized that it would be advantageous to develop a high bandwidth energetically autonomous combustion device that is capable of very fast energy extraction to ensure that mechanical work is performed before significant heat losses can occur. It has further been recognized that it would be advantageous to develop a combustion device that reduces and simplifies energy conversion steps, wherein power is modulated directly at the source to thereby reduce size, mass and system complexity while increasing overall reliability, efficiency and power density.

The present invention provides such a device and includes a combustion chamber having an extinguishing section, an ignition section, and a combustion section intermediate the extinguishing section and the igniter section. An igniter can be operatively coupled to the combustion chamber at the ignition section and a first supply system and a second supply system can be operatively coupled to the combustion chamber at the extinguishing section, the first supply system configured to supply fuel to the combustion chamber, the second supply system configured to supply an oxidizer to the combustion chamber, the fuel and oxidizer being configured to combine and form a combustible mixture. The combustion chamber can be configured to provide for the combustible mixture to fill the combustion chamber from the extinguishing section toward the ignition section and to be ignited by the igniter adjacent the ignition section, wherein combustion proceeds through the combustion section from the ignition section toward the extinguishing section and then extinguishes. At least one energy extraction device can be operatively coupled to the combustion chamber to extract energy from combustion of the combustible mixture.

In accordance with a more detailed aspect of the present invention, the system provides for combustion to proceed through the combustion section from the ignition section toward the extinguishing section at a supersonic combustion rate. An inside surface of the combustion chamber can include surface irregularities to promote turbulent flow of the combustible material through the combustion chamber to thereby increase a combustion rate of the combustible material.

In accordance with a more detailed aspect of the present invention, the at least one energy extraction device can be operatively coupled to a side of the combustion chamber.

In accordance with a more detailed aspect of the present invention, at least one energy extraction device is operatively coupled to an end of the combustion chamber.

In accordance with a more detailed aspect of the present invention, the system includes a plurality of combustion chambers, wherein the at least one energy extraction device can be operatively coupled to the plurality of combustion chambers to extract energy from combustion of the combustible mixture in the plurality of combustion chambers.

In accordance with a more detailed aspect of the present invention, the system includes a combustion control system, operatively coupled to the plurality of combustion chambers to selectively operate each of the plurality of combustion chambers.

In accordance with a more detailed aspect of the present invention, the system includes a plurality of energy release ports, formed in a side of the combustion chamber to direct the energy from combustion of the combustible mixture to the at least one energy extraction device.

In accordance with a more detailed aspect of the present invention, the energy extraction device includes a piston, operatively coupled to the combustion chamber to be driven by energy from combustion of the combustible mixture.

In accordance with a more detailed aspect of the present invention, the piston is operatively coupled to a power device, the power device being selected from the group consisting of an electric generator, a fluid pump, a hydraulic pump, a pneumatic pump, and a mechanical transducer.

In accordance with a more detailed aspect of the present invention, the energy extraction device is selected from the group consisting of a turbine, a thrust nozzle, and a pressure chamber.

In accordance with a more detailed aspect of the present invention, the system includes a flow restriction device, operatively coupled to the combustion chamber to restrict a rate at which the fuel and oxidizer enter the combustion chamber.

In accordance with a more detailed aspect of the present invention, the system includes a third supply system, operatively coupled to the combustion chamber to introduce into the combustion chamber a buffer material. The combustion chamber can be configured to provide for the combustible mixture and the buffer material to simultaneously fill the chamber in a stratified condition.

In accordance with a more detailed aspect of the present invention, the system includes an annular inlet port, operatively coupled intermediate the third supply system and the combustion chamber to fill the combustion chamber with the buffer material along an annular path adjacent an inside diameter of the combustion chamber.

In accordance with a more detailed aspect of the present invention, a ratio of a length of the combustion chamber to an inside diameter of the combustion tube is greater than 5:1.

In accordance with a more detailed aspect of the present invention, a length of the combustion chamber is less than 15 cm.

In accordance with a more detailed aspect of the present invention, a combustion device is provided including an elongate combustion tube having i) an inlet section including an inlet for combustible material; and ii) an ignition section, including an igniter displaced along a length of the tube from the inlet section to ignite the combustible material; and at least one energy extraction device, operatively coupled to the combustion tube, configured to extract energy from combustion of the combustible mixture.

In accordance with a more detailed aspect of the present invention provides a combustion device including an elongate combustion tube having an inlet section and an ignition section displaced along a length of the tube from the inlet section, to receive and combust a combustible material; an igniter, operatively coupled to the combustion tube at the ignition section, to ignite the combustible material; a primary energy extraction device, operatively coupled to the combustion tube, driven by combustion of the combustible material to extract a greater amount of energy over a longer period of time; and a secondary energy extraction device, operatively coupled to the combustion tube, driven by combustion of the combustible material to extract a lesser amount of energy over a shorter period of time, as compared to the primary energy extraction device.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 1A is an end sectional view of a combustion chamber or tube in accordance with an embodiment of the present invention;

FIG. 6A is a side schematic view of another embodiment of the present invention;

FIG. 6B is an end schematic view of the embodiment of the present invention illustrated in FIG. 6A.

DETAILED DESCRIPTION

Figure 1:
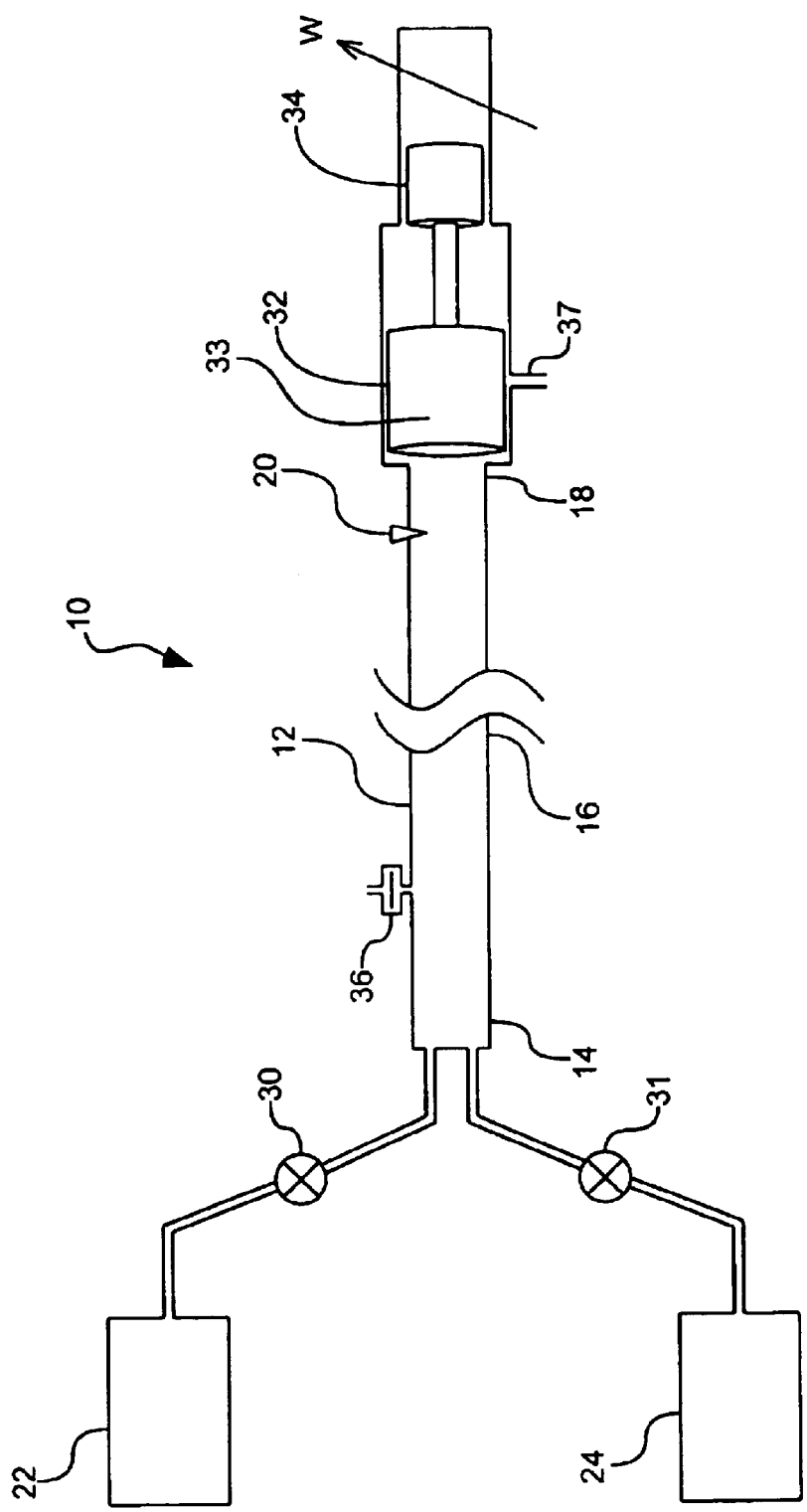
FIG. 1 is a schematic view of a controllable combustion device in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As illustrated in FIG. 1, a combustion system, indicated generally at 10, in accordance with the present invention is shown for providing controllable combustion of a combustible material. In accordance with one aspect of the present invention, the system 10 includes a combustion chamber or tube 12 that can include an extinguishing or inlet section 14, an ignition section 18, and a combustion section 16 intermediate the extinguishing section and the igniter section. The igniter section 18 can be displaced along a length of the tube from the inlet section, such that the igniter and inlet sections are separated by at least a portion of the length of the tube. In the embodiment illustrated in FIG. 1, the ignition and inlet sections are located at opposing ends of the chamber or tube 12. However, it is to be understood that the positions of the ignition sections, the extinguishing or inlet section and the combustion section can be at any location along the length of the tube and can be located in any order relative to each other.

An igniter 20 can be operatively coupled to the combustion chamber or tube at the ignition section to facilitate ignition of a combustible material. The igniter can be of any type known to those skilled in the art, including a hot filament, autocatalytic platinum, or standard spark plug. The igniter can be located as illustrated in FIG. 1, or can be located anywhere along a length of the tube 12. In one embodiment, the igniter is located midway along the length of tube. In this embodiment, combustible material can proceed past the igniter to fill the length of the tube. Once the igniter is initiated, combustion proceeds away from the igniter in opposing directions toward both ends of the tube.

The combustion system can include a first supply system 22 and a second supply system 24, each operatively coupled to the combustion chamber or tube 12. The first and second supply systems can be coupled to the tube near the extinguishing section 14, or at any location along the length of the tube. The first supply system 22 can supply fuel to the combustion chamber or tube, and the second supply system 24 can supply an oxidizer to the combustion chamber or tube. As the fuel and oxidizer fill the combustion tube, they can combine and form a combustible material. By displacing the ignition section along a length of the tube or chamber from the inlet section, the two materials can mix as they travel along the length of the tube to form a combustible material prior to reaching the ignition section. The first and second supply systems can also deliver any materials which form a combustible material when combined. The type of fuel can be any known to those skilled in the art, such as propane, ethane, acetylene, hydrogen, etc. The first and second supply systems can include means for pressurizing the first and second material. For instance, in one embodiment of the present invention, the oxidizer supply is air pressurized at 100 to 150 psi and the fuel supply is also pressurized.

The combustion tube 12 can be formed of any material known to those skilled in the art, including steel, aluminum, high temperature metallic alloys, or high temperature micromachinable materials such as Silicon or Silicone-Carbide or other machinable ceramics. The size of the tubes can similarly vary, but in one embodiment a ratio of a length of the combustion chamber or tube to an inside diameter of the combustion tube is greater than 5:1. In another embodiment, a length of the combustion chamber or tube is less than 15 cm. In another embodiment, the diameter of the chamber or tube can range from 0.2 mm to 2 mm and a length can range from 20 mm to 150 mm. The size of the combustion tube or chamber can also be in the micro range. This unique aspect of the present invention can allow the combustion device to be used in MEMS applications such as micro-sized machines for use in a variety of applications.

In the embodiment illustrated in FIG. 1, the combustion system is configured to fill the combustion chamber or tube 12 with a combustible material from the extinguishing section 14, through the combustion section 16, toward the ignition section 18 and to the igniter 20. Once the combustible material reaches the igniter 20, it is ignited, after which combustion proceeds, as shown by flame front 26, from the ignition section 18, through the combustion section 16, toward the extinguishing section 14, at which time combustion is extinguished as the fuel is substantially, completely consumed. As combustion byproducts are formed, they can be released from the tube adjacent the ignition section, or at any location along the length of the tube. The locations of the various sections of the tubes as described herein are for exemplary purposes only. It is to be understood that the various sections can be located anywhere along the length of the tube and in any configuration relative to one another.

It will be appreciated that the present invention can provide a system for alternately filling the tube with a combustible material from the extinguishing to the ignition section and combusting the material from the ignition section to the extinguishing section. The combustion/filling cycle can be controlled through various means, discussed in more detail below, to provide very rapid combustion rates, very high combustion/filling cycle rates, and very flexible combustion profiles.

First and second valves 30 and 31, respectively, can be included in the first and second supply systems to control the inlet of materials to aid in controlling combustion rates and combustion/fill cycles. The valves can be of any type known to those skilled in the art such as high speed fuel injector valves, or check valves, such as poppet or reed valves. The valves can be passively or actively controlled, as discussed in more detail below.

The combustion system can be configured such that combustion proceeds through the tube or chamber 12 at a supersonic combustion rate. Increasing the combustion rate of the combustible material can be accomplished in many ways. The pressure and temperature of the combustible can both be adjusted to control the combustion rate. Also, as shown in FIG. 1A, an inside surface of the combustion chamber or tube 12' can be formed with surface irregularities 11 which disrupt the flow of the combustible material along the inside surface of the combustion chamber or tube. The surface irregularities can be of any shape or size, and can extend lengthwise along the combustion chamber or tube and at various points along a cross section of the chamber or tube.

The disruption caused by the irregularities can create turbulent flow of the material, which can increase the rate at which the material combusts. As an example, typical internal combustion engines burn combustible material (typically gasoline and air) at a rate in the range of 10–20 m/sec. It has been found that one embodiment of the present invention can combust materials at speeds considerably higher than 300 m/sec, a much faster rate of combustion. By increasing the combustion rate of the material, a very high mass of the combustible material can be burned per unit time, resulting in higher power output. Also, a cleaner combustion can be realized, resulting in less pollutants contained in combustion by-products.

An energy extraction device 32 advantageously can be operatively coupled to the combustion chamber or tube to extract energy from combustion of the combustible mixture. As the combustible material combusts, pressure and heat are produced which exert a force on the energy extraction device. The energy extraction device can then transfer this energy to a power source 34. As shown in FIG. 1, the energy extraction device 32 can include a piston 33, or piston/cylinder. The combustion of the combustible materials can act on the piston 33 to move the piston in the cylinder. Movement of the piston 33 can be used by the energy extraction device, such as to drive hydraulics, pneumatics, or rotational or linear mechanical devices, etc. It is of course understood that the energy extraction device can include other devices, including, but not limited to, a turbine, a thrust nozzle, a pressure chamber or tube, a shape memory alloy heater, a diaphragm, and a flexure valve. In one embodiment of the present invention, the combustion chamber or tube is used to provide heat for an energy extraction device, such as a heat exchanger, a Stirling engine, or a phase change device. Similarly, the power source 34 can include other sources, including, but not limited to, an electric generator, a fluid pump, a resonant pump, and a resonant electrical supply. Any device which can benefit from converting energy extracted by the energy extraction device can be used as a power source.

A flow restriction device 36 can be operatively coupled to the combustion chamber or tube to restrict a rate at which the fuel and oxidizer or combustible material enter the combustion chamber or tube. The flow restriction device can be located near the extinguishing section 14, but can alternately be located anywhere along the length of the chamber or tube 12. The flow restriction device can be used to assist in controlling the rate at which materials enter the chamber or tube. The flow restriction device can be passively or actively controlled. In this manner, combustion rates and fill/combust cycles can be controlled to achieve optimal operation. The flow restriction device can be of any type known to those skilled in the art, such as a reed valve or a poppet valve. An exhaust outlet 37 can be located near the end of the piston 33 to exhaust combustion byproducts. Once the piston has reached the limit of its stroke, the side of the piston, which can ordinarily seal the exhaust port, clears the exhaust and allows the exhaust to exit the combustion chamber or tube. As combustible material again enters the chamber or tube, the exhaust is forced out the exhaust port. The exhaust port can also be controlled via valves, as is known in the art.

It will be appreciated that the present invention thereby provides a revolutionary class of actuators tailored to enable the use of a combustion device to provide high bandwidth, low-pollutant power sources for a variety of applications. Some applications that can benefit from such a device include wearable, and non-wearable, energetically autonomous machines such as: exoskeletons for human performance augmentation, legged robots, and other ambulatory systems that require servo-level force control with minimal weight requirements. These compact actuators can be suitable for use with any application that requires a high bandwidth, energetically autonomous power supply.

Figure 1B:
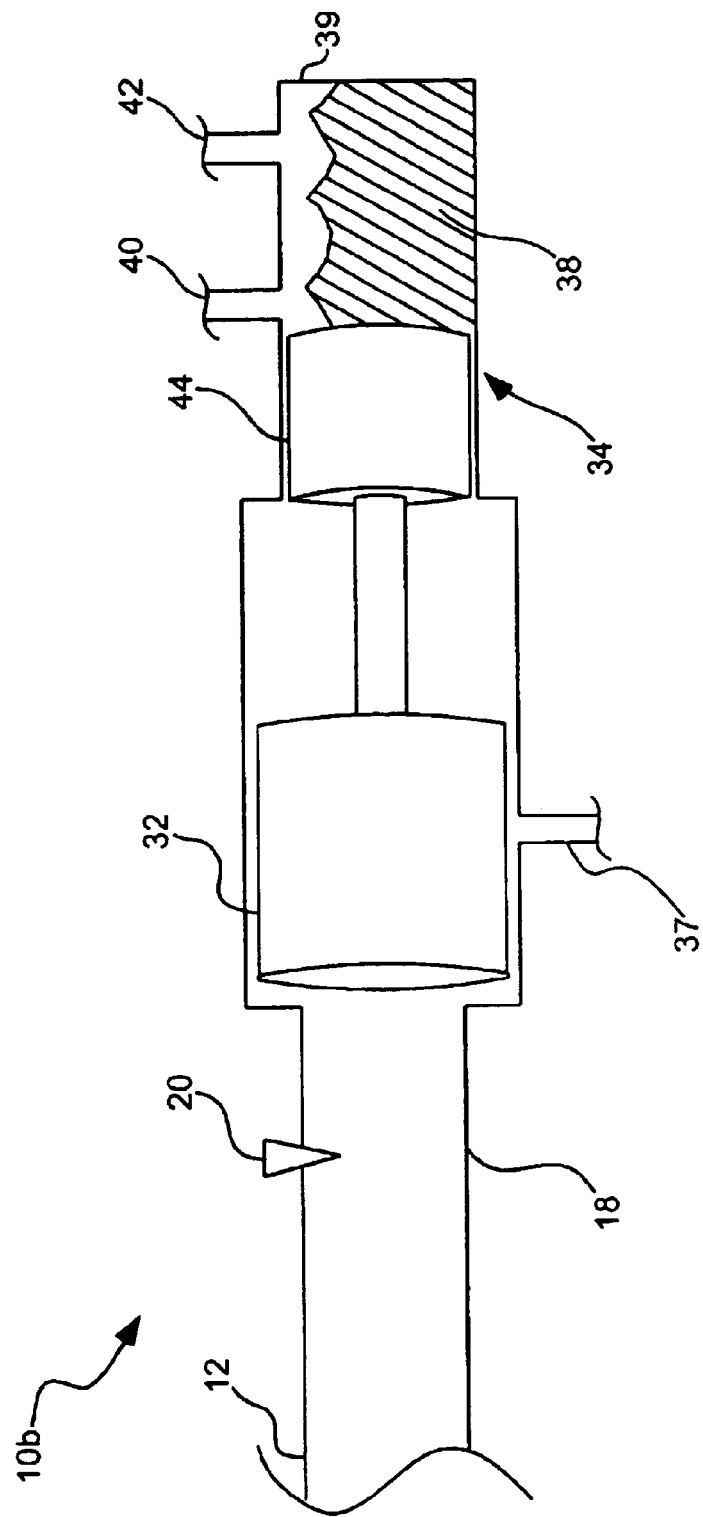
FIG. 1B is a schematic view of an alternate embodiment of the device illustrated in FIG. 1.

As illustrated in FIG. 1B, one embodiment of the power source 34 can be a fluid pump or compressor. A fluid 38 can be provided in a reservoir 39 by a low pressure supply input 40. After the reservoir is filled with the low pressure fluid, the energy extraction device 34 can extract energy from combustion of the combustible material and transfer the energy to a small piston 44. The small piston 44 is then driven toward the low pressure supply input and seals the input upon contact. Once the low pressure supply input is sealed, the small piston pressurizes the fluid 38 and forces the pressurized fluid out high pressure outlet 42. High pressure output 42 can then be sealed and the small piston returned to its original location. In this manner, energy from cyclic combustion in the combustion chamber or tube can be converted to pressurized fluid, which can be used to perform useful work. The fluid 38 can be compressible or incompressible and can be used, for instance for a pneumatic device or a hydraulic device. The low pressure input and high pressure output can include valves (not shown) which control the input and output of fluid. The valves can be any kind known to those skilled in the art, including poppet valves or reed valves. The fluid pump can itself be of any type known to those skilled in the art, the embodiment illustrated in FIG. 1B being only for exemplary purposes.

Figure 1C:
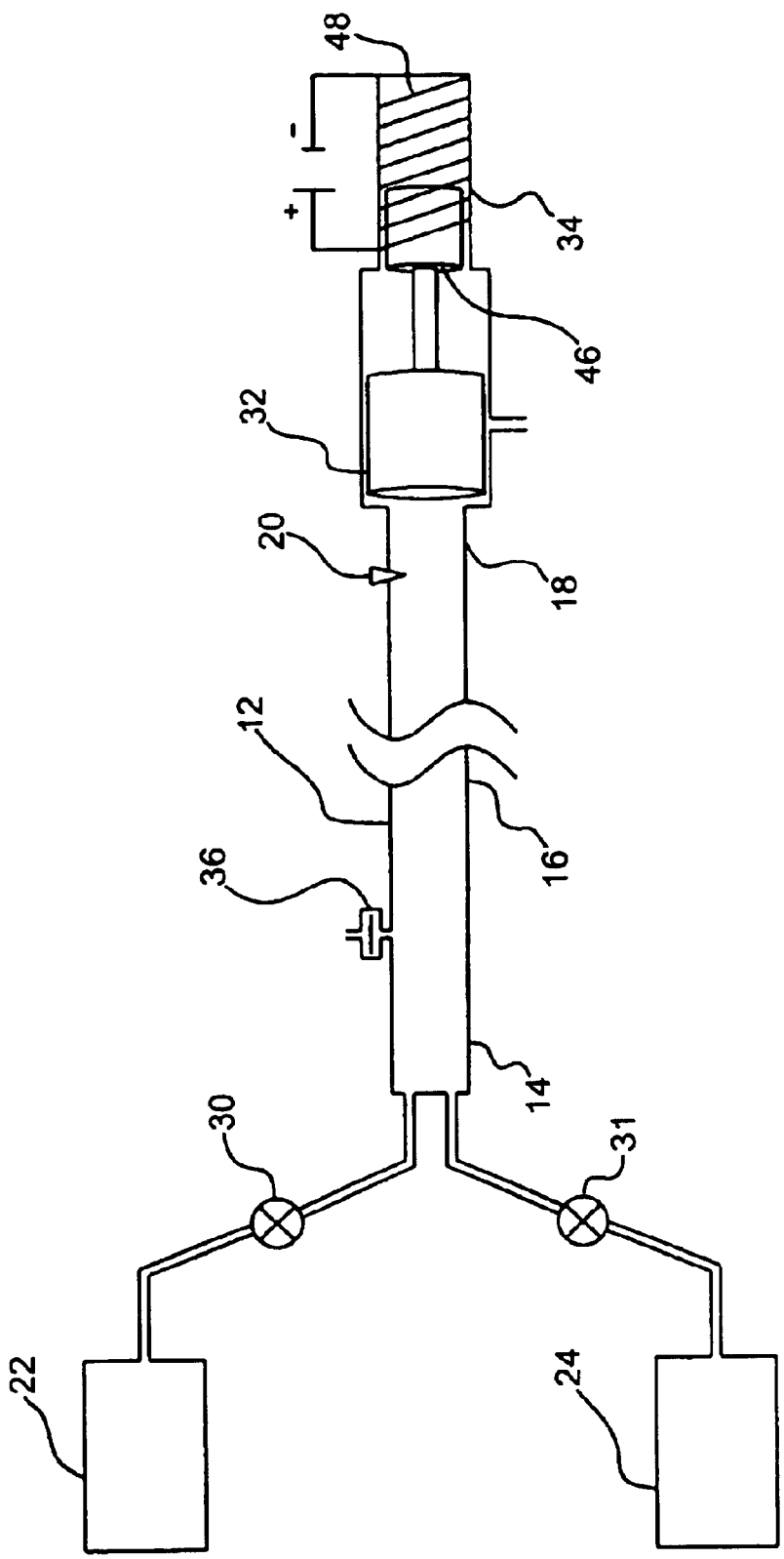
FIG. 1C is a schematic view of an alternate embodiment of the device illustrated in FIG. 1.

As illustrated in FIG. 1C, the power source 34 can also be an electric generator. As the energy extraction device 32 extracts energy from combustion of the combustible material, relative motion of the energy extraction device is translated into relative motion of a stator and plunger assembly in the electric generator. In the embodiment illustrated in FIG. 1C, a rod 46 can be fitted with magnets (not shown) which pass through a coil 48 in response to motion of the energy extraction device 32. Of course, the configuration of the magnet and coil can be reversed, and the coil can pass through a magnetic field instead. In either case, the motion of the rod in response to motion of the extraction device creates electricity which can be used to perform useful work. Of course, the linear motion of the piston 32 can also be translated into rotary motion for use in a conventional rotary electric generator.

Figure 1D:
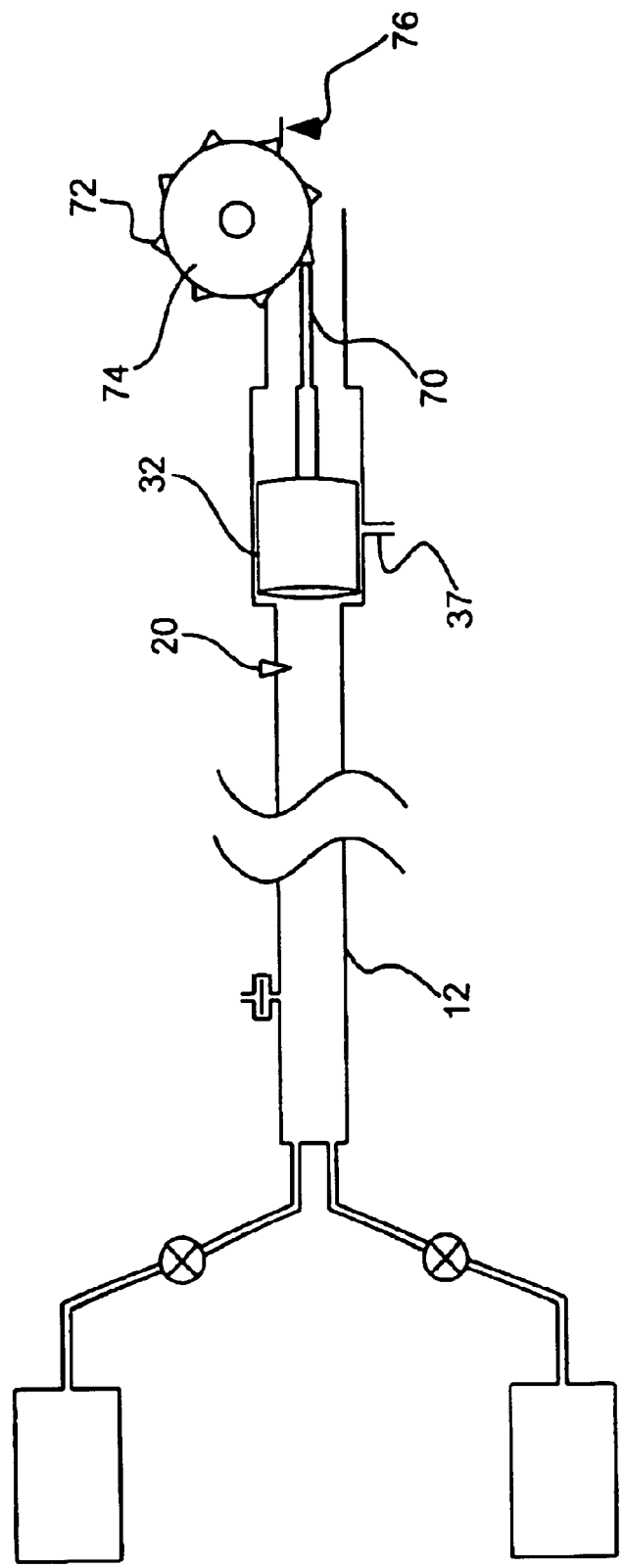
FIG. 1D is a schematic view of an alternate embodiment of the device illustrated in FIG. 1.

As illustrated in FIG. 1D, the power source 34 can also be a mechanical transducer. Here, an actuator 70 can be coupled to the piston 32. As the actuator is moved by the piston 32, linear motion is converted into rotational motion as the actuator contacts cogs 72 on a ratcheting wheel 74. As the wheel 72 rotates past a particular location, a retainer 76 can prevent the wheel from rotating back to its original position. This configuration can be used to convert the linear cycle of the piston 32 into discrete rotational motion. Of course the mechanical transducer can be of any type known to those skilled in the art.

Figure 1E:
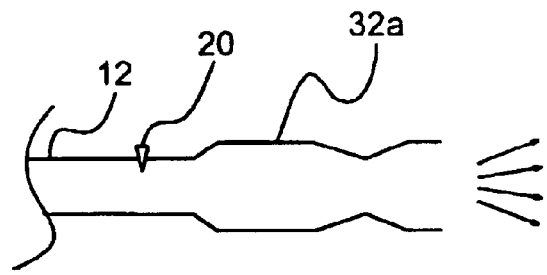
FIG. 1E is a schematic view of an alternate embodiment of the device illustrated in FIG. 1.
Figure 1F:
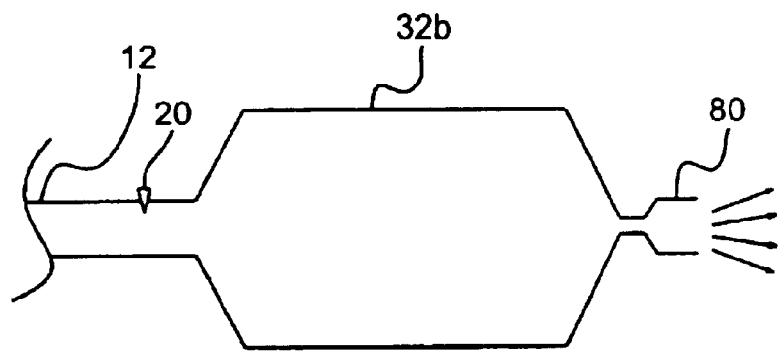
FIG. 1F is a schematic view of an alternate embodiment of the device illustrated in FIG. 1.
Figure 1G:
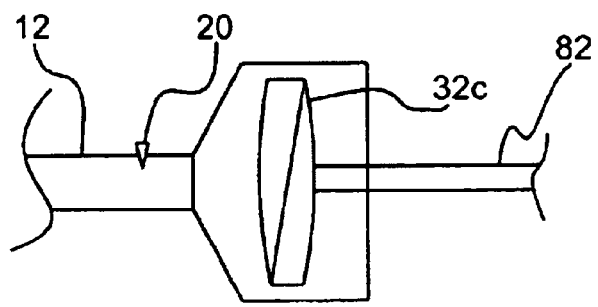
FIG. 1G is a schematic view of an alternate embodiment of the device illustrated in FIG. 1.

As illustrated in FIGS. 1E through 1G, the energy extraction device can be of any type known to those in the art. In the embodiment illustrated in FIG. 1E, the energy extraction device 32a is a thrust nozzle. As combustion produces pressure, the pressurized material flows into the thrust nozzle, where its exit is restricted. A corresponding reaction force is applied to the tube or chamber. As illustrated in FIG. 1F, the energy extraction device can be a pressure chamber 32b. Here, the pressure produced by combustion of the combustible material is stored in the pressure chamber to be released from exit 80. Also, as illustrated in FIG. 1G, the energy extraction device can be a turbine 32c. As pressure produced by combustion of the combustible material passes around the turbine, the turbine generates rotational energy which can be extracted by a rotational power source (not shown) at shaft 82.

Figure 2:
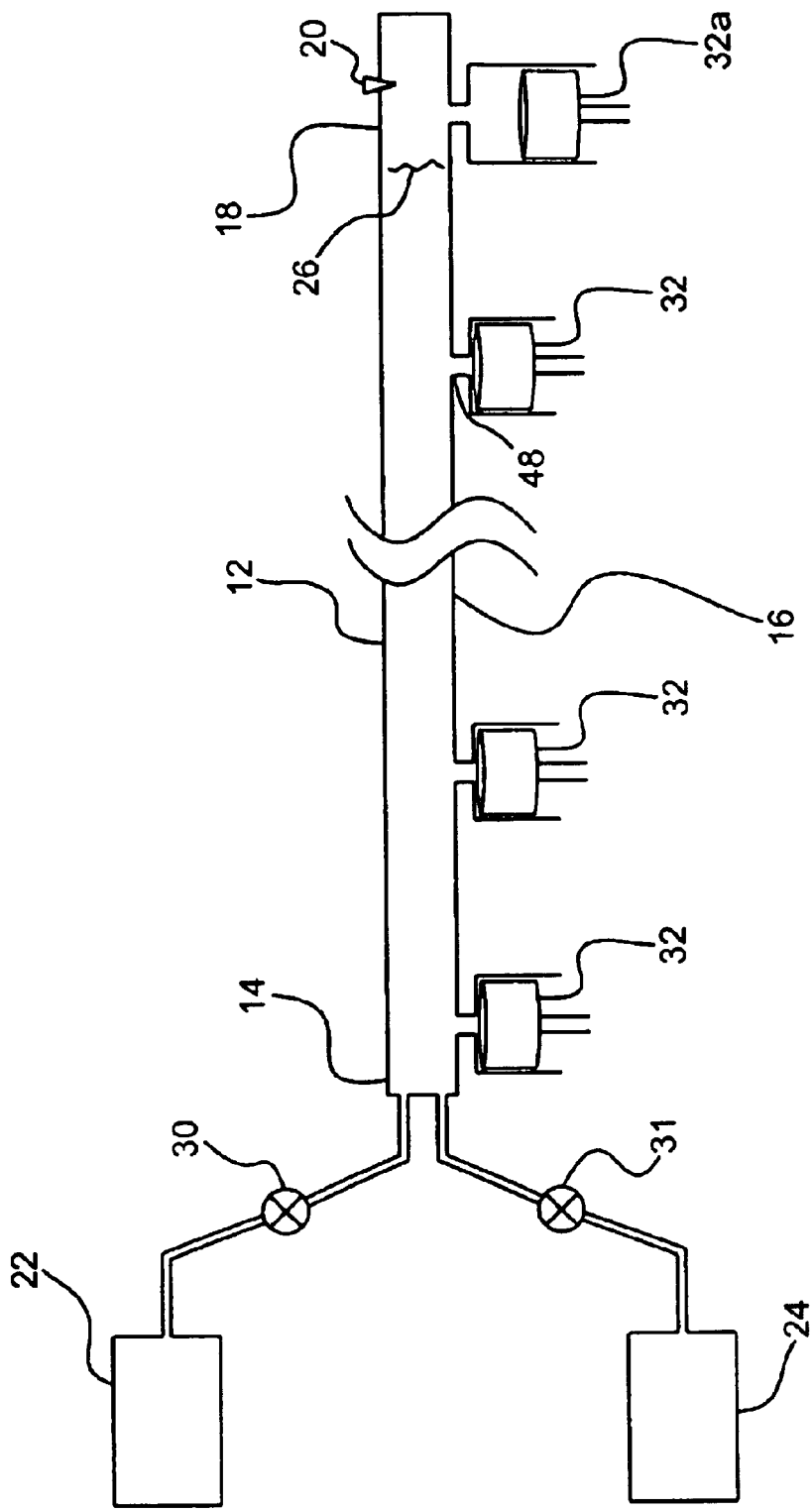
FIG. 2 is a schematic view of another embodiment of the present invention.

Referring to FIG. 2, a combustion system 10d can include a plurality of energy extraction devices 32 operatively coupled to the combustion chamber or tube 12. The plurality of energy extraction devices can be coupled to a side of the combustion chamber or tube. A plurality of ports 48 can be formed along the length of the combustion chamber or tube for directing combustion of the combustible material to the energy extraction devices 32. As the flame front 26 travels from the ignition section, through the combustion section to the extinguishing section, each energy extraction device is successively activated. The state as shown in FIG. 2 illustrates a first energy extraction device 32a having already been activated as the flame front has passed a point of coupling. The combustion system 10d can be similar to that described above, and can include all of the features and advantages. Combustion byproducts can be exhausted through one main exhaust port or can be exhausted through individual exhaust ports associated with each energy extraction device.

Figure 3A:
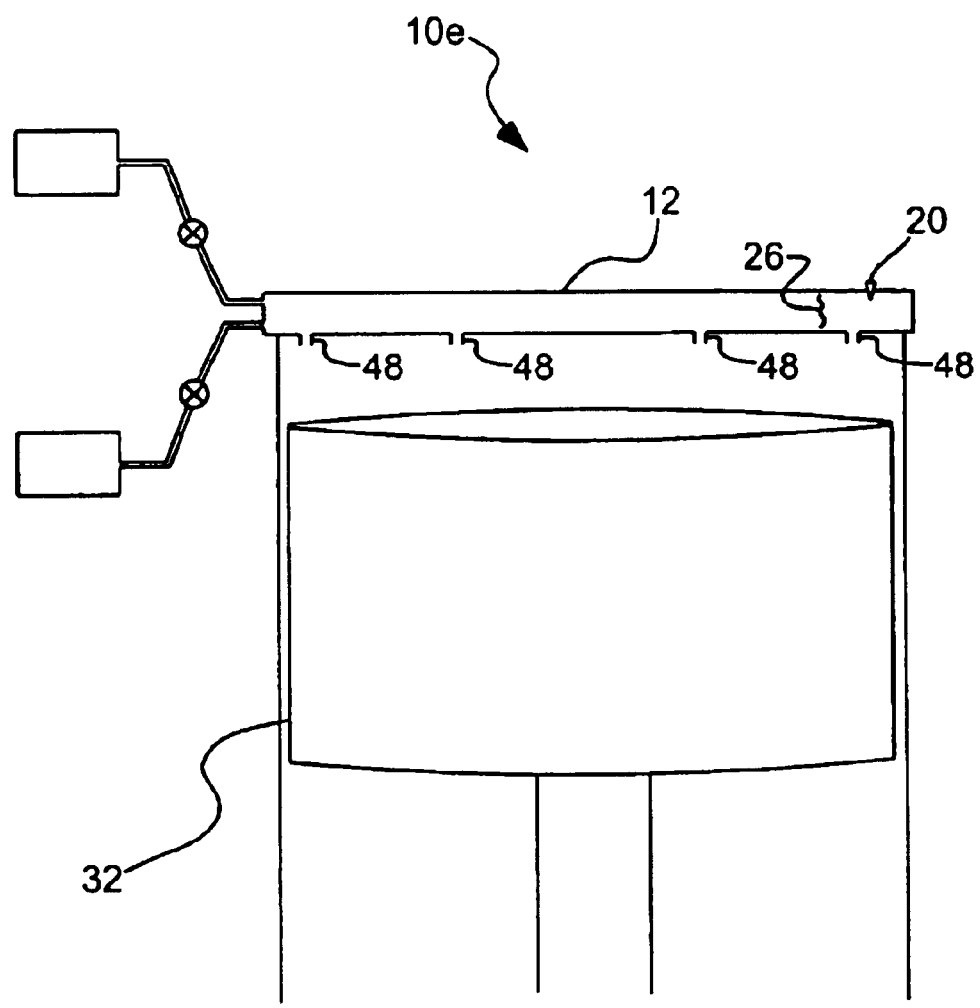
FIG. 3A is a side schematic view of another embodiment of the present invention.
Figure 3B:
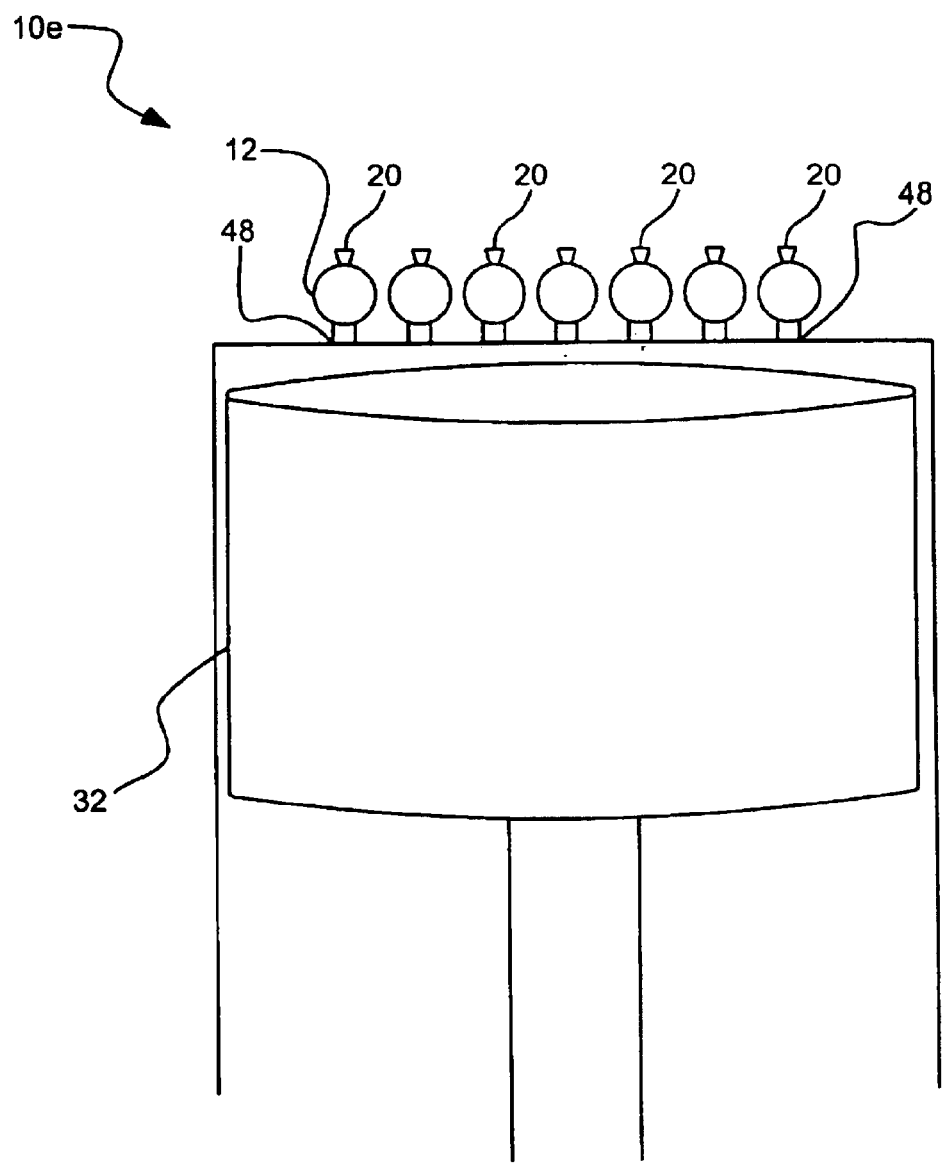
FIG. 3B is an alternate side schematic view of the embodiment of the present invention illustrated in FIG. 3A.

Referring to FIGS. 3A and 3B, a combustion system 10e can include a plurality of combustion chambers or tubes 12 operatively coupled to one or more energy extraction devices 32. Longitudinal axes of the plurality of combustion chamber or tubes 12 can be oriented orthogonally with respect to a longitudinal axis of the energy extraction device 32. Lateral ports 48 can be positioned along the length of the combustion chambers or tubs 12 to allow energy from combustion of the combustible material to operate the energy extraction device. All of the combustion tubes can be operated simultaneously to provide energy for the energy extraction device, or the tubes can be selectively operated to employ lesser tubes at one time, depending on the desired amount of energy.

Figure 3C:
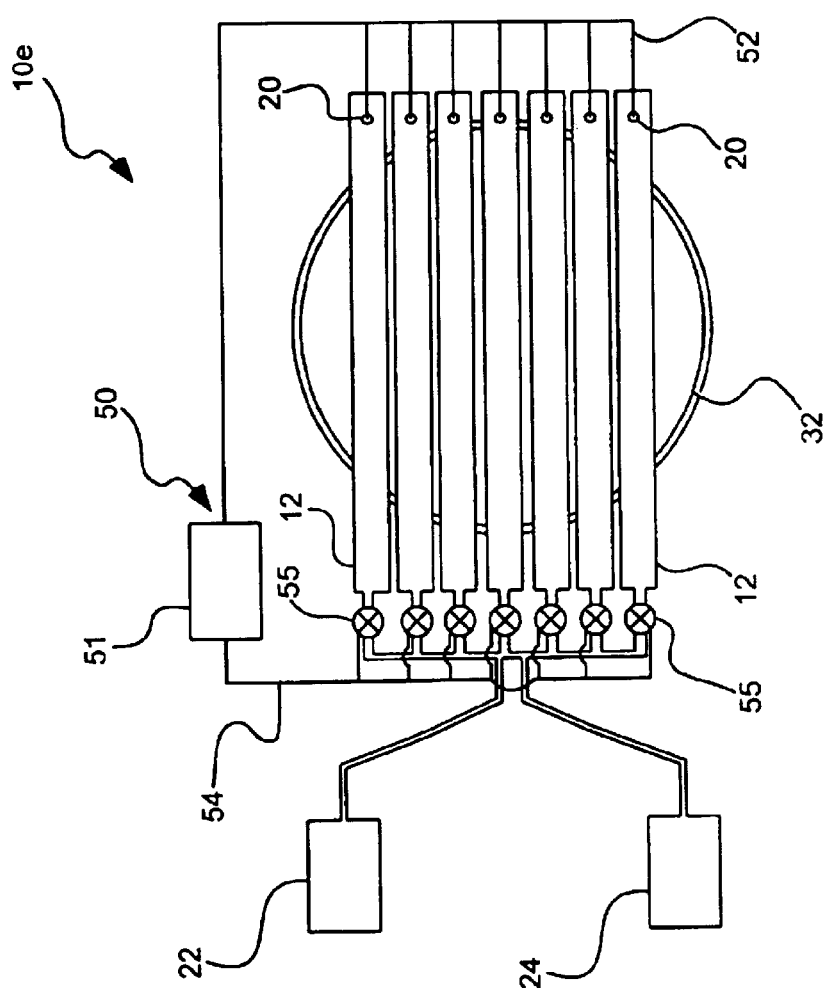
FIG. 3C is a top schematic view of the embodiment of the present invention illustrated in FIG. 3A.

Referring to FIG. 3C, the combustion tubes can be selectively operated as a group or in individual firing patterns to obtain the desired amount energy. The plurality of combustion tubes 12 can be selectively operated by use of a combustion control system 50. The combustion control system can consist of a master control unit 51 which can be any type of controller known to those skilled in the art, such as a traditional computer with control software. A series of ignition control leads 52 in operational communication with each of igniters 20 can control the extent or timing of igniter activity in each tube 12. Each tube can be fitted with its own control valve 55 which controls how much, if any, combustible material is allowed to enter the tube. Each tube can have one or more control valves that control the amount of combustible material that enters the tube. Of course, each tube can also be fitted with two valves, one of each controlling the inlet of fuel, oxidizer or other material. A series of valve control leads 54 can be in operational communication with the master controller to selectively operate each valve.

It will be appreciated that, in this manner, combustion in each of the tubes 12 can be independently controlled. The control unit can be used to fire a number of tubes at one time, and fire the remaining tubes at a later time. Selectively controlling the combustion of the combustion tubes can be useful, for instance, when only a fraction of the power generated by all tubes is required at any one time. Selectively controlling the combustion of the combustion tubes can also be useful in situations where the combustion cycle rate of one tube is limited and it is desired to operate the energy extraction device at a faster cycle. In such a case, some of the tubes could be operated at one frequency, with others of the tubes 180° out of phase with the other tubes. Such a configuration could operate the energy extraction device at twice the cycle rate of the tubes.

Figure 3D:
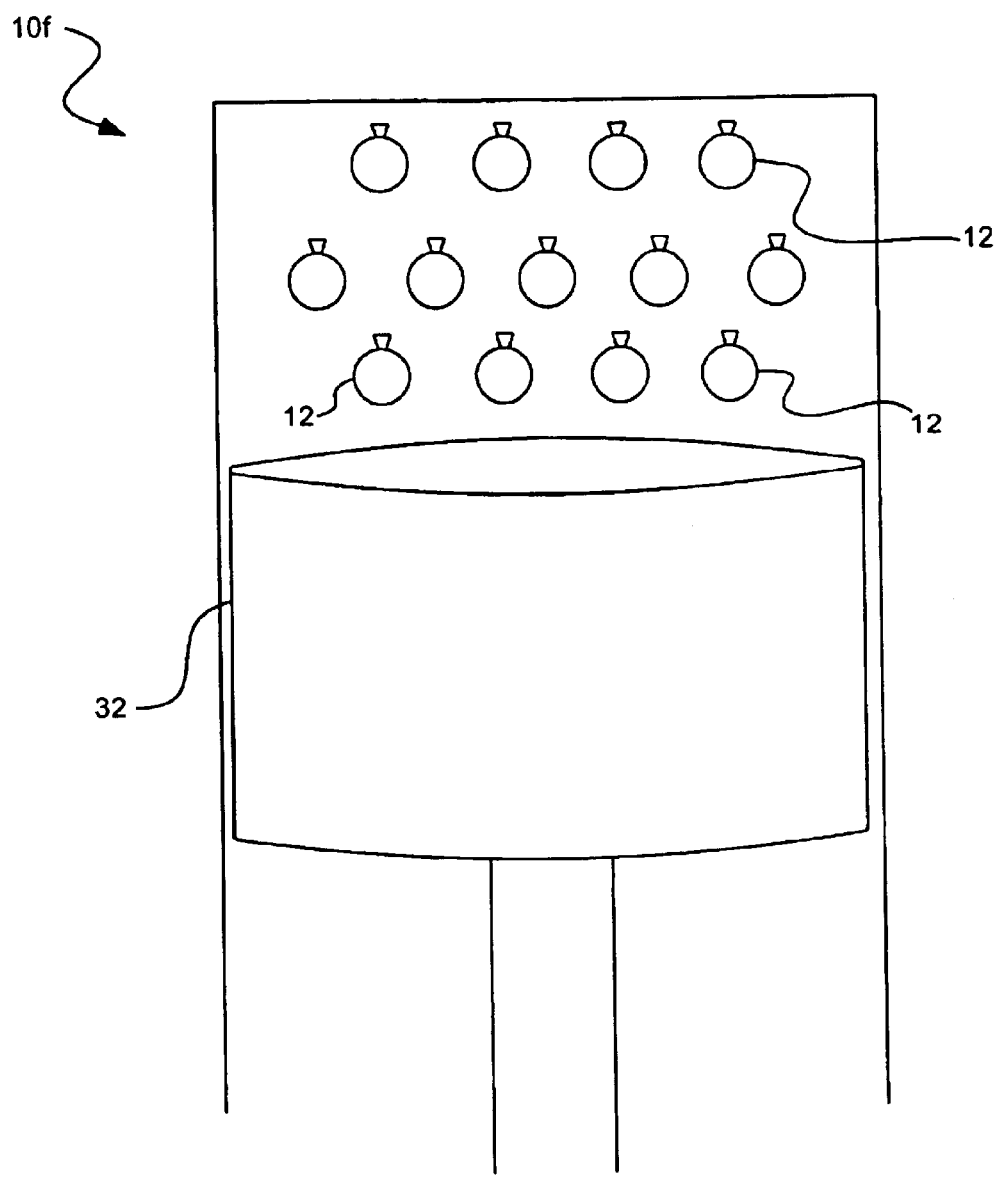
FIG. 3D is a side schematic view of another embodiment of the present invention.

Referring to FIG. 3D, an alternate configuration of a combustion system 10f with an energy extraction device 32 coupled to ends of a plurality of tubes 12. The tubes can be oriented orthogonally with respect to the energy extraction device in a stacked configuration. The tubes could, for instance, be mounted in a manifold, although any other mounting assembly can be used. In this manner, combustion sequences could be even further varied by, for example, simultaneously firing all of the tubes in one row, then firing the tubes in another row, etc.

Figure 3E:
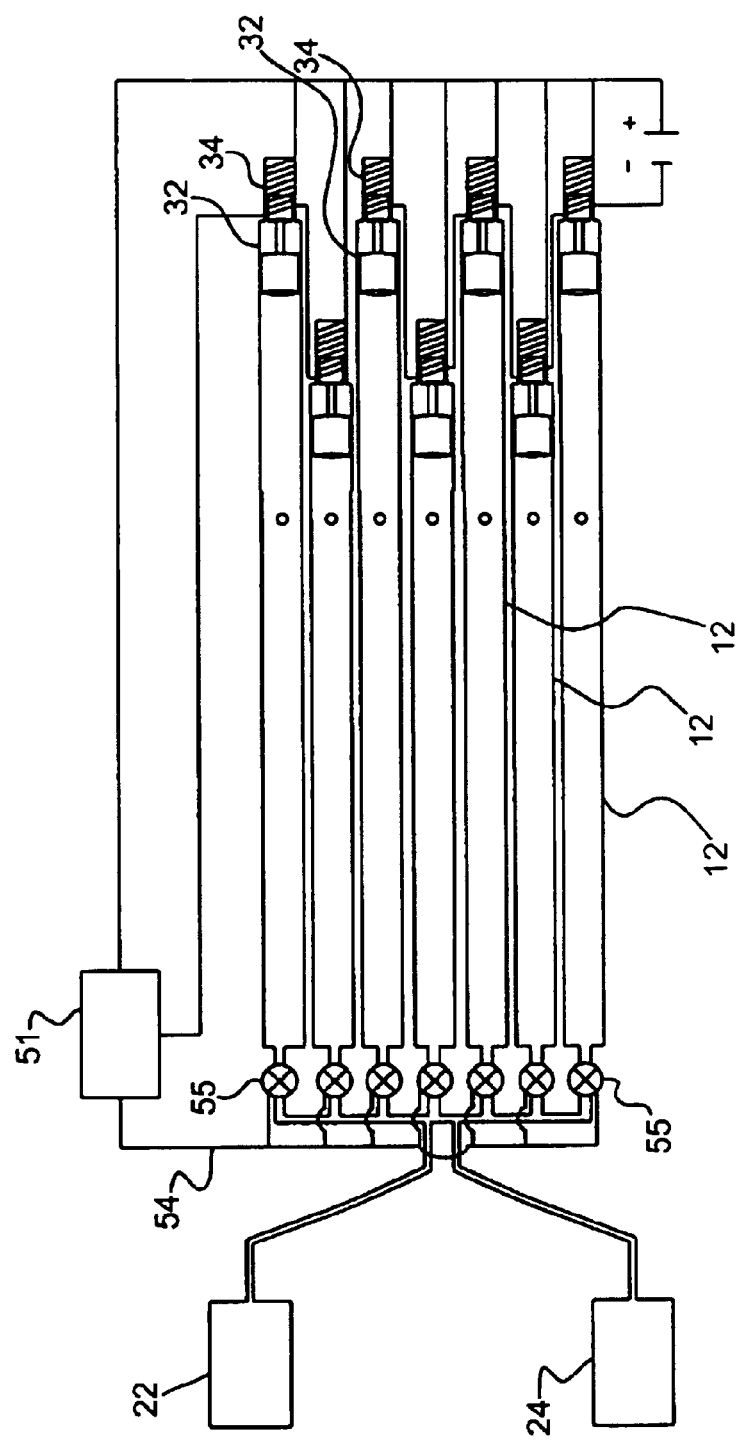
FIG. 3E is a side schematic view of another embodiment of the present invention.

As illustrated in FIG. 3E, a plurality of combustion tubes 12 can be disposed in an array, each of the combustion chambers or tubes operatively coupled to an energy extraction device 32 and power device 34. In this manner, the combustion control system 51 can selectively operate the combustion tubes or chambers to produce a desired output. As the exemplary embodiment of FIG. 3E illustrates, the power devices can be electric generators, similar to the embodiment shown in FIG. 1C. Of course, the energy extraction devices and power devices can be of any type known to those in the art. In the present embodiment, the tubes can be, for instance, selectively controlled in response to an energy demand by a secondary system (not shown). For example, the system in FIG. 3E can be coupled to a system that requires electricity at variable levels. One or more tubes can be selectively operated to supply the electricity to power the secondary device.

Figure 4A:
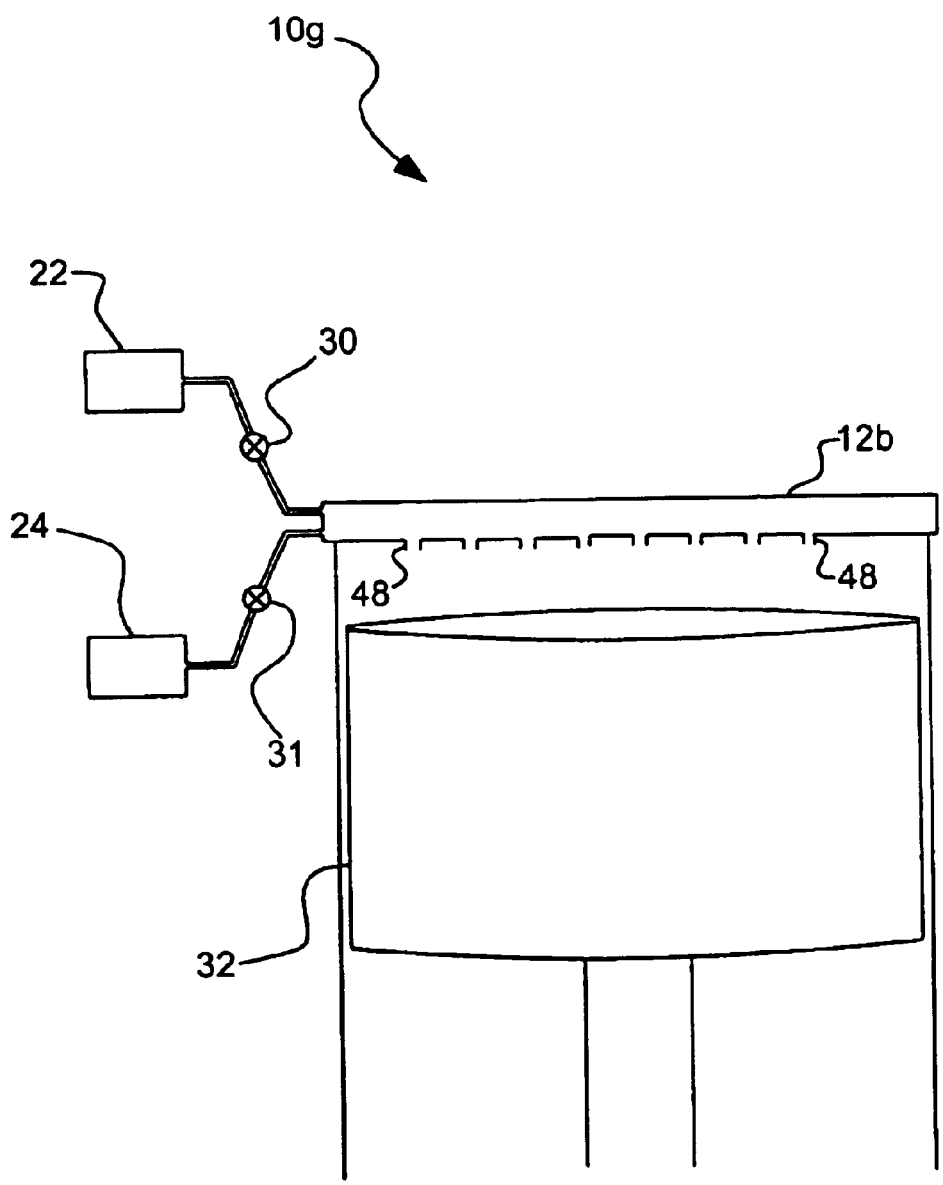
FIG. 4A is a side schematic view of another embodiment of the present invention.
Figure 4B:
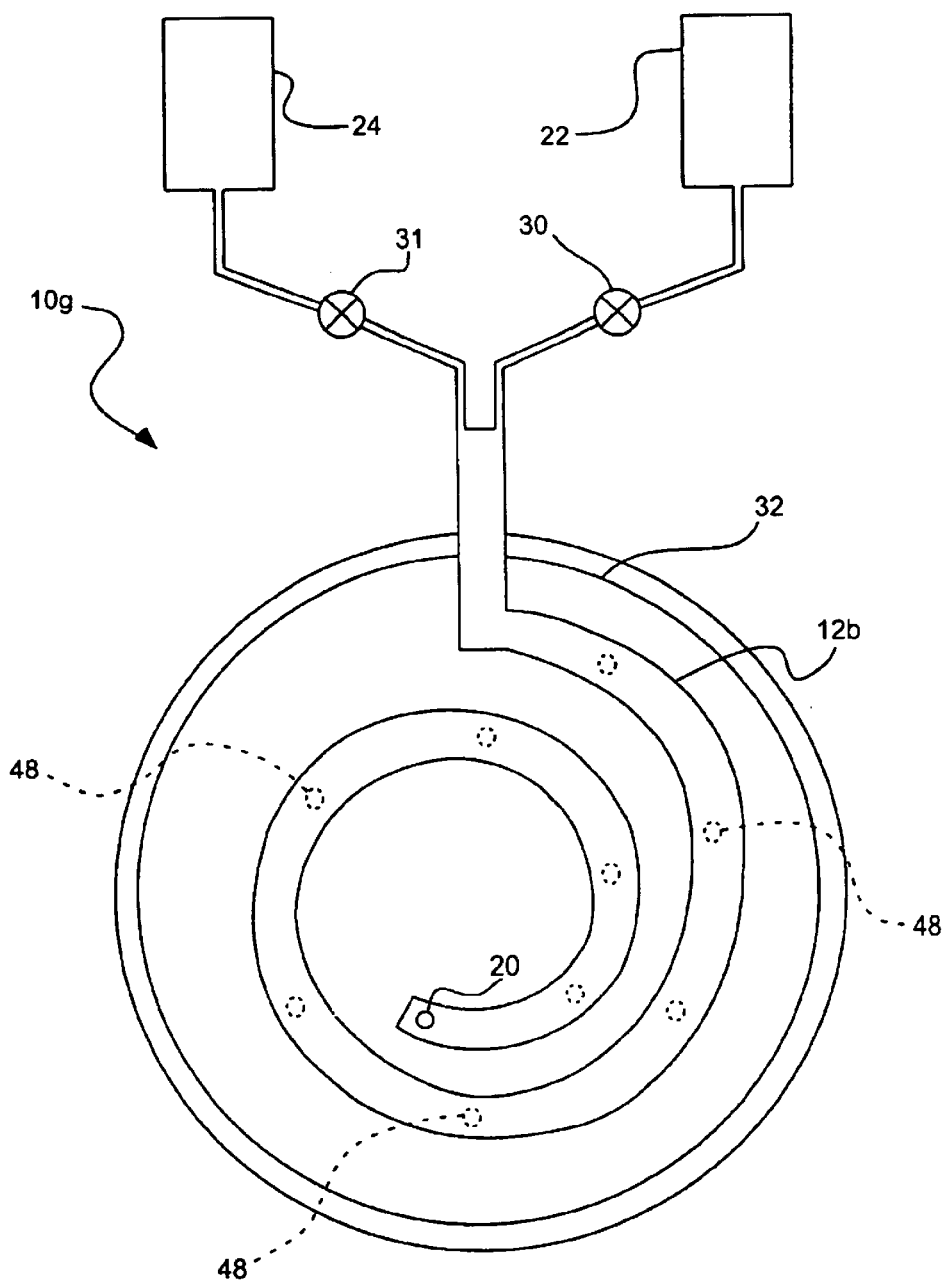
FIG. 4B is a top schematic view of the embodiment of the present invention illustrated in FIG. 4A.

Referring to FIGS. 4A and 4B, another combustion system 10g can include a curved and/or spiral shaped combustion tube 12b with one or more ports 48 coupled to one or more energy extraction device 32. The curved or spiral shaped combustion tube 12b allows the combustion tube to more closely match the shape of the energy extraction device, such as a circular shape of the piston/cylinder. In addition, the curved or spiral shape allows the use of a longer combustion tube. The energy outlet ports 48 can release energy from combustion of the combustible material into contact with the energy extraction device. The spiral shape of the combustion tube can have a larger radius near an outside diameter of the energy extraction device, and a smaller radius near the igniter 20. The energy release ports release energy from combustion of the combustible material downward, into the cylinder housing the energy extraction device. Of course, exhaust and/or flow restriction ports or valves can also be used with this embodiment, as discussed in other embodiments.

Figure 5:
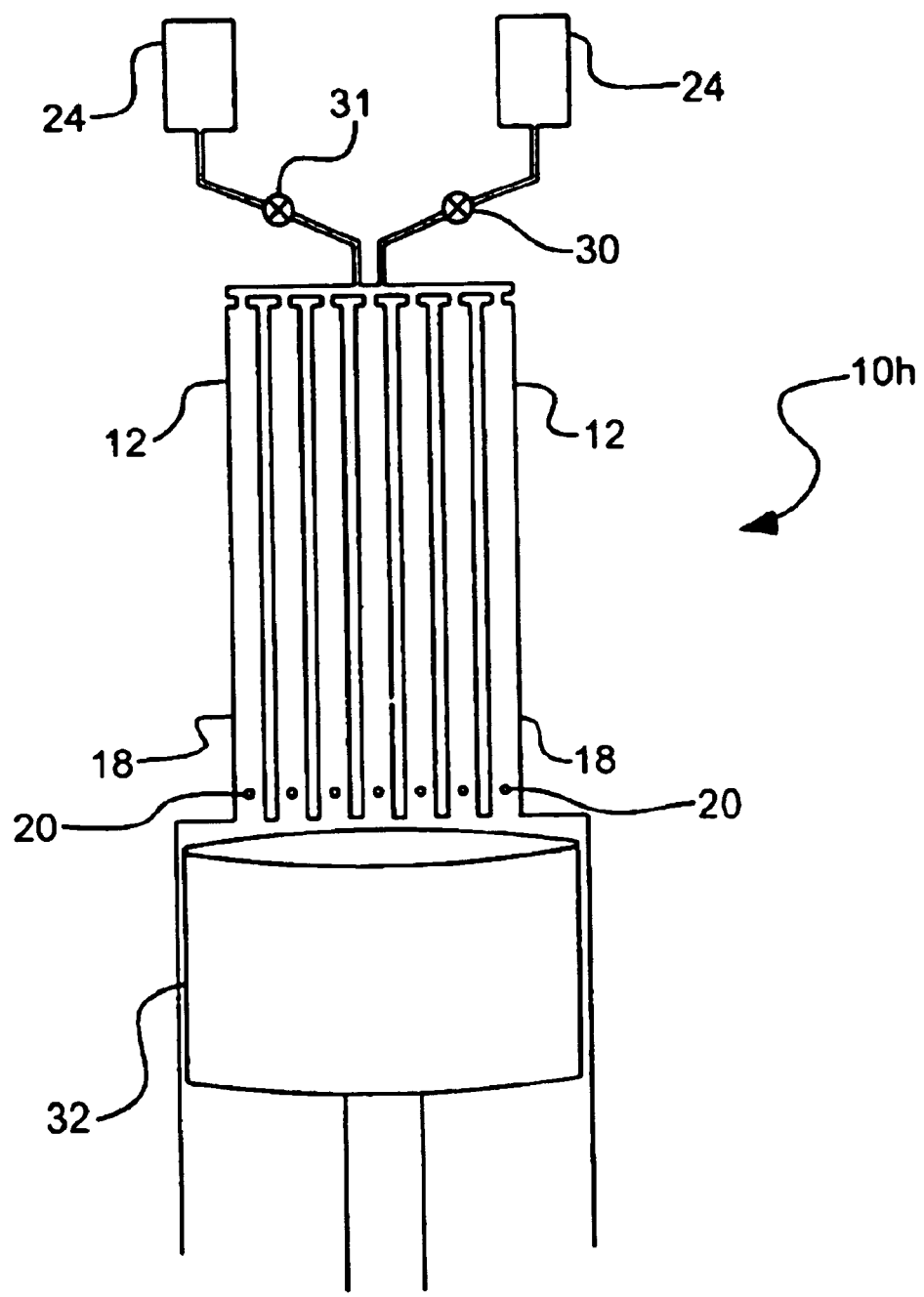
FIG. 5 is a schematic view of another embodiment of the present invention.

Referring to FIG. 5, another combustion system 10h includes combustion tubes 12 oriented lengthwise with respect to the energy extraction device, or with the longitudinal axis of the combustion tubes parallel to the longitudinal axis of the energy extraction device. Energy produced from combustion of the combustible material is released through ends of the combustion tubes near the ignition sections 18 directly towards the energy extraction device. It is believed that directing the energy of the combustion directly towards the energy extraction device reduces flow losses. Such a combustion system can employ a controller system, similar to that shown in FIG. 3C, to selectively operate the tubes.

Referring to FIGS. 6A and 6B, another combustion system 10i can include a third supply system 60 operatively coupled to the combustion chamber or tube 12 to introduce into the chamber or tube a buffer material. The buffer material can be any material that is not readily combustible in the present tube environment. For example, the buffer material can be air, which is not readily combustible in the tube without being mixed with a fuel. The buffer material can also be the same material as the oxidizer, or the fuel when not mixed with an oxidizer. The third supply system can be coupled to the combustion chamber or tube by an annular inlet port 62. Of course, any coupling of the third supply system and the tube known to those skilled in the art could be used as well. The combustible material and buffer material can enter the tube in a stratified condition. A buffer layer 64 of the buffer material can be formed around the combustible material as the materials progress along the tube.

This stratified condition is advantageous in that the buffer layer can thermally isolate the combustible material from an inside wall of the tube to prevent autoignition of the combustible material due to heat from the wall. The buffer layer can also be advantageous in that it may reduce flame quenching by restricting heat loss through the wall of the chamber or tube and by restricting interaction between reactive radicals and the wall of the tube. By reducing autoignition and flame quenching, the rate and timing of combustion can be more accurately controlled. The stratified condition can also be created by using additional, buffer, material from the first supply system, without the need for a third supply system.

Figure 7:
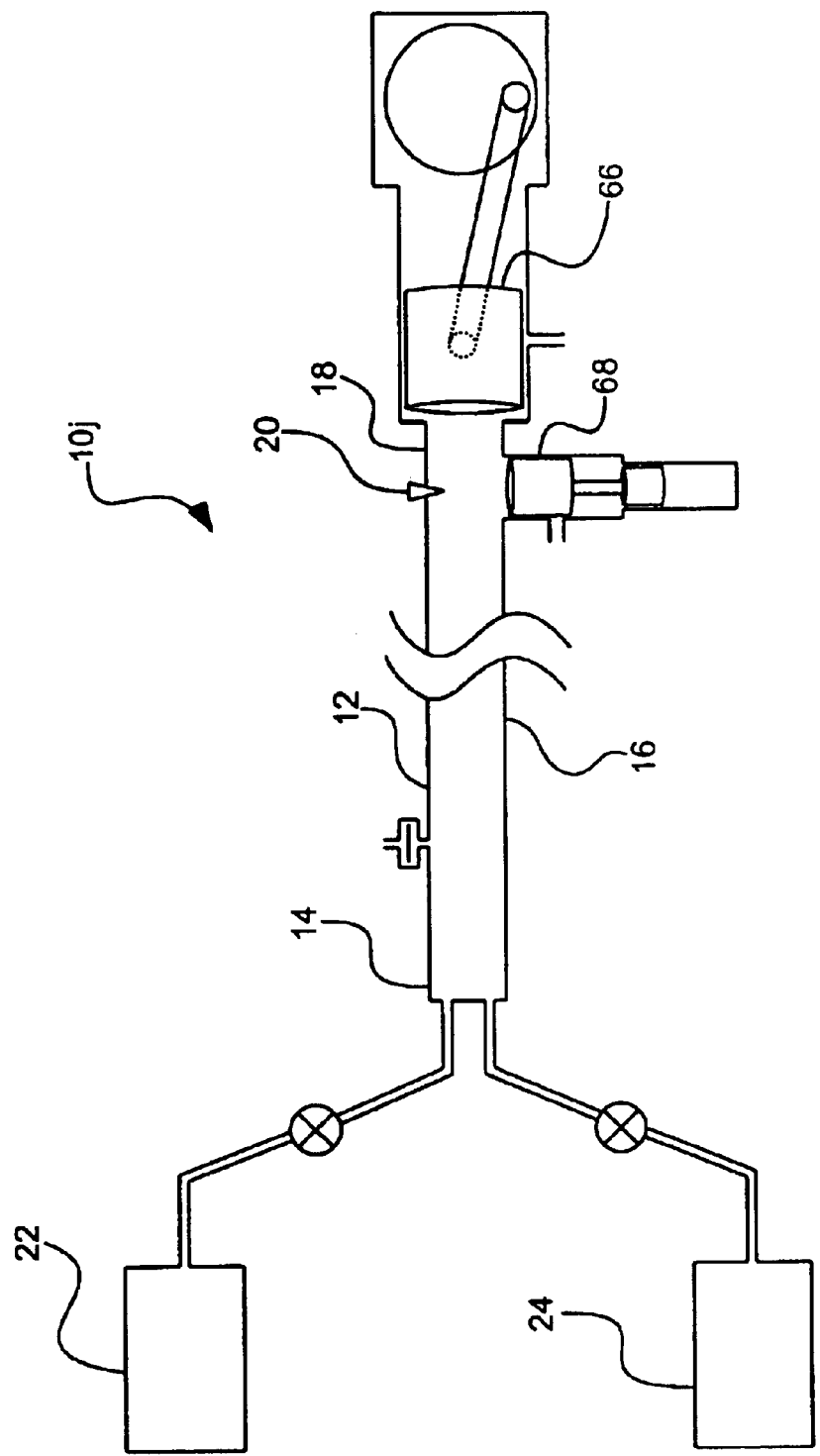
FIG. 7 is a schematic view of an alternate embodiment of the present invention.

Referring to FIG. 7, another combustion system 10j in accordance with the present invention is shown which is similar in many respects to those described above. The combustion system 10j can include primary and secondary energy extraction devices 66 and 68. The primary energy extraction device 66 is operatively coupled to the combustion tube to be driven by combustion of the combustible material. The primary energy extraction device can be configured to extract a greater amount of energy over a longer period of time. The primary energy extraction device 66 can include a piston movably disposed in a cylinder and operatively coupled to a rotatable member by a pivoting arm to convert reciprocal linear motion of the piston to rotational movement of the rotatable member. As stated above, the primary energy extraction device 66, or the rotational member, can be configured to extract a greater amount of energy, but over a longer period of time. The secondary energy extraction device 68 also is operatively coupled to the combustion tube to be driven by combustion of the combustible material. The secondary energy extraction device can be configured to extract a lesser amount of energy over a shorter period of time. Therefore, as the combustion system 10j is operated, or as the combustible material combusts, the secondary energy extraction device 68 can extract a smaller amount of energy quickly, before the primary energy extraction device 66 extracts a larger amount of energy. Therefore, the combustion system 10j can be configured for a primary purpose using the primary energy extraction device 66, while simultaneously providing energy for a secondary purpose using the secondary extraction device 68.

The primary energy extraction device 66 can be a reciprocating piston and the secondary energy extraction device 68 can be a fluid pump similar to the embodiments discussed above. Of course, the primary and secondary extraction devices can take the form of any of the embodiments previously discussed, such as electric generators, etc. The present invention thus provides a secondary energy extraction device that can rapidly extract a portion of the energy from combustion of the combustible material before a significant portion of the energy is lost to heat. This "parasitic" secondary energy extraction device can be operated at very fast bandwidths due to its smaller size and lower rate. As an example, a parasitic energy extraction device could be operatively coupled to a combustion system configured for lower bandwidth performance, such as driving a reciprocating engine, and yet be, itself, driven at a high bandwidth. In such a scenario, an electric generator or hydraulic pump, which might require high bandwidth response to drive a particular application upon immediate demand.

It is to be understood that the above-referenced arrangements are only illustrative of the application for the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A combustion device, comprising:
    a combustion chamber having an extinguishing section, an ignition section, and a combustion section intermediate the extinguishing section and the ignition section;
    an igniter operatively coupled to the combustion chamber at the ignition section;
    a first supply system and a second supply system, operatively coupled to the combustion chamber at the extinguishing section, the first supply system configured to supply fuel to the combustion chamber, the second supply system configured to supply an oxidizer to the combustion chamber, the fuel and oxidizer being configured to combine and form a combustible mixture;

the combustion chamber being configured to provide for the combustible mixture to fill the combustion chamber from the extinguishing section toward the ignition section and to be ignited by the igniter adjacent the ignition section, combustion proceeding through the combustion section from the ignition section toward the extinguishing section and then extinguishing; and at least one energy extraction device, operatively coupled to a side of the combustion chamber adjacent the ignition section, and being configured to extract energy from combustion of the combustible mixture.

2. A device in accordance with claim 1, wherein combustion proceeds through the combustion section from the ignition section toward the extinguishing section at a supersonic combustion rate.

3. A device in accordance with claim 1, wherein an inside surface of the combustion chamber includes surface irregularities to promote turbulent flow of the combustible material through the combustion chamber to thereby increase a combustion rate of the combustible material.

4. A device in accordance with claim 1, wherein the at least one energy extraction device is operatively coupled to an end of the combustion chamber proximate the ignition section of the combustion chamber.

5. A device in accordance with claim 1, wherein the energy extraction device is selected from the group consisting of a turbine, a thrust nozzle and a pressure chamber.

6. A device in accordance with claim 1, further comprising a flow restriction device, operatively coupled to the combustion chamber, and configured to restrict a rate at which the fuel and oxidizer enter the combustion chamber.

7. A device in accordance with claim 1, further comprising:

a third supply system, operatively coupled to the combustion chamber, configured to introduce into the combustion chamber a buffer material; and the combustion chamber being configured to provide for the combustible mixture and the buffer material to simultaneously fill the chamber in a stratified condition.

8. A device in accordance with claim 7, further comprising an annular inlet port, operatively coupled intermediate the third supply system and the combustion chamber, configured to fill the combustion chamber with the buffer material in an annular path adjacent an inside diameter of the combustion chamber.

9. A device in accordance with claim 1 wherein a ratio of a length of the combustion chamber to an inside diameter of the combustion chamber is greater than 5:1.

10. A device in accordance with claim 1 wherein a length of the combustion chamber is less than 15 cm.

11. A method of extracting energy, comprising the steps of:

filling from an inlet section at least one combustion tube with a combustible mixture;

igniting the combustible mixture with an igniter displaced along a length of the combustion tube from the inlet section at an ignition section of the tube, combustion proceeding through the tube away from the ignition section; and extracting energy from combustion of the combustible mixture with at least one energy extraction device operatively coupled to a side of the combustion chamber adjacent the ignition section.

12. A method in accordance with claim 11, wherein the step of combusting the combustible material includes combusting the combustible material at a supersonic combustion rate.

13. A method in accordance with claim 11, wherein the step of extracting energy from combustion of the combustible material includes extracting energy from an end of the combustion tube.

14. A method in accordance with claim 11, wherein the step of extracting energy from combustion of the combustible material includes extracting energy with a secondary power output, the secondary power output being selected from the group consisting of a turbine, a thrust nozzle, and a pressure chamber.

15. A method in accordance with claim 11, further comprising the step of restricting a rate of flow of the combustible mixture into the combustion tube with a flow-restricting device.

16. A method in accordance with claim 11, further comprising the step of simultaneously filling the combustion tube with a buffer material and the combustible mixture in a stratified condition.

17. A combustion device, comprising:

an elongate combustion tube having:
  i) an inlet section including an inlet for combustible material; and
  ii) an ignition section, including an igniter displaced along a length of the tube from the inlet section to ignite the combustible material; and at least one energy extraction device, operatively coupled to a side of the combustion tube adjacent the ignition section, configured to extract energy from combustion of the combustible mixture.

18. A device in accordance with claim 17, wherein the combustion tube is configured to be filled with the combustible material from the inlet section toward the ignition section, combustion proceeding through the combustion tube away from the ignition section.

19. A device in accordance with claim 17, further comprising a first supply system and a second supply system each operatively coupled to the combustion tube adjacent the inlet section, the first supply system configured to supply fuel to the combustion chamber, the second supply system configured to supply an oxidizer to the combustion chamber, the fuel and oxidizer configured to combine and form the combustible mixture.

20. A device in accordance with claim 17, wherein combustion proceeds through the combustion tube away from the ignition section at a supersonic combustion rate.

21. A device in accordance with claim 17, wherein an inside surface of the combustion tube includes surface irregularities to promote turbulent flow of the combustible material through the combustion tube to thereby increase a combustion rate of the combustible material.

22. A device in accordance with claim 17, wherein the at least one energy extraction device is operatively coupled to an end of the combustion tube.

23. A device in accordance with claim 17, wherein the energy extraction device includes a piston, operatively coupled to the combustion tube, configured to be driven by energy from combustion of the combustible mixture.

24. A device in accordance with claim 23, wherein the piston is operatively coupled to a power device, the power device being selected from the group consisting of an electric generator, a fluid pump, a hydraulic pump, a pneumatic pump, and a mechanical transducer.

25. A device in accordance with claim 17, wherein the energy extraction device is selected from the group consisting of a turbine, a thrust nozzle, and a pressure chamber.

26. A device in accordance with claim 17, further comprising a flow restriction device, operatively coupled to the combustion tube, configured to restrict a rate at which the fuel and oxidizer enter the combustion tube.

27. A device in accordance with claim 17, further comprising:

a third supply system, operatively coupled to the combustion tube, configured to introduce into the combustion tube a buffer material; and the combustion tube being configured to provide for the combustible mixture and the buffer material to simultaneously fill the tube in a stratified condition.

28. A device in accordance with claim 27, further comprising an annular inlet port operatively coupled intermediate the third supply system and the combustion tube, the annular inlet port configured to fill the combustion tube with the buffer material in an annular path adjacent an inside diameter of the combustion tube.

29. A device in accordance with claim 17 wherein a ratio of a length of the combustion tube to an inside diameter of the combustion tube is greater than 5:1.

30. A device in accordance with claim 17 wherein a length of the combustion tube is less than 15 cm.

31. A combustion device, comprising:

a plurality of combustion chambers each having an extinguishing section, an ignition section, and a combustion section intermediate the extinguishing section and the ignition section;

at least one igniter operatively coupled to each combustion chamber at the ignition section;

a first supply system and a second supply system, operatively coupled to the combustion chambers at the extinguishing section, the first supply system configured to supply fuel to the combustion chambers, the second supply system configured to supply an oxidizer to the chambers, the fuel and oxidizer being configured to combine and form a combustible mixture;

the combustion chambers being configured to provide for the combustible mixture to fill the combustion chambers from the extinguishing section toward the ignition section and to be ignited by the igniter adjacent the ignition section, combustion proceeding through the combustion section from the ignition section toward the extinguishing section and then extinguishing; and at least one energy extraction device, operatively coupled to the combustion chambers adjacent the ignition section, and being configured to extract energy from combustion of the combustible mixture.

32. A device in accordance with claim 31, further comprising a combustion control system, operatively coupled to the plurality of combustion chambers, to selectively operate each of the plurality of combustion chambers.

33. A combustion device, comprising:

a combustion chamber having an extinguishing section, an ignition section, and a combustion section intermediate the extinguishing section and the ignition section;

an igniter operatively coupled to the combustion chamber at the ignition section;

a first supply system and a second supply system, operatively coupled to the combustion chamber at the extinguishing section, the first supply system configured to supply fuel to the combustion chamber, the second supply system configured to supply an oxidizer to the combustion chamber, the fuel and oxidizer being configured to combine and form a combustible mixture;

the combustion chamber being configured to provide for the combustible mixture to fill the combustion chamber from the extinguishing section toward the ignition section and to be ignited by the igniter adjacent the ignition section, combustion proceeding through the combustion section from the ignition section toward the extinguishing section and then extinguishing;

at least one energy extraction device, operatively coupled to the combustion chamber adjacent the ignition section, and being configured to extract energy from combustion of the combustible mixture; and a plurality of energy release ports, formed in a side of the combustion chamber, configured to direct the energy from combustion of the combustible mixture to the at least one energy extraction device.

34. A combustion device, comprising:

a combustion chamber having an extinguishing section, an ignition section, and a combustion section intermediate the extinguishing section and the ignition section;

an igniter operatively coupled to the combustion chamber at the ignition section;

a first supply system and a second supply system, operatively coupled to the combustion chamber at the extinguishing section, the first supply system configured to supply fuel to the combustion chamber, the second supply system configured to supply an oxidizer to the combustion chamber, the fuel and oxidizer being configured to combine and form a combustible mixture;

the combustion chamber being configured to provide for the combustible mixture to fill the combustion chamber from the extinguishing section toward the ignition section and to be ignited by the igniter adjacent the ignition section, combustion proceeding through the combustion section from the ignition section toward the extinguishing section and then extinguishing; and at least one piston, operatively coupled to the combustion chamber adjacent the ignition section, and being configured to be driven by energy from combustion of the combustible mixture.

35. A device in accordance with claim 34, wherein the piston is operatively coupled to a power device, the power device being selected from the group consisting of an electric generator, a fluid pump, a hydraulic pump, a pneumatic pump, and a mechanical transducer.

36. A method of extracting energy, comprising the steps of:

filling from an inlet section a plurality of combustion tubes with a combustible mixture;

igniting the combustible mixture with an igniter displaced along a length of the combustion tubes from the inlet section at an ignition section of the tubes, combustion proceeding through the tubes away from the ignition section; and extracting energy from combustion of the combustible mixture with at least one energy extraction device operatively coupled to the combustion tubes adjacent the ignition section.

37. A method of extracting energy, comprising the steps of:

filling from an inlet section at least one combustion tube with a combustible mixture;

igniting the combustible mixture with an igniter displaced along a length of the combustion tube from the inlet section at an ignition section of the tube, combustion proceeding through the tube away from the ignition section; and extracting energy from combustion of the combustible mixture with a piston operatively coupled to the combustion chamber adjacent the ignition section.

38. A method in accordance with claim 37, further comprising the step of converting energy extracted by the piston into an alternate form, the alternate form being selected from the group consisting of electricity, fluid power and mechanical power.

39. A combustion device, comprising:

a plurality of elongate combustion tubes each having:
 i) an inlet section including an inlet for combustible material; and
 ii) an ignition section, including an igniter displaced along a length of the tube from the inlet section to ignite the combustible material; and at least one energy extraction device, operatively coupled to the combustion tubes adjacent the ignition section, configured to extract energy from combustion of the combustible mixture.

40. A device in accordance with claim 39, further comprising a combustion control system, operatively coupled to the plurality of combustion tubes, to selectively operate each of the plurality of combustion tubes.

41. A combustion device, comprising:

an elongate combustion tube having:
 i) an inlet section including an inlet for combustible material; and
 ii) an ignition section, including an igniter displaced along a length of the tube from the inlet section to ignite the combustible material;

at least one energy extraction device, operatively coupled to the combustion tube adjacent the ignition section, configured to extract energy from combustion of the combustible mixture;

a plurality of energy release ports, formed in a side of the combustion tube, configured to direct the energy from combustion of the combustible mixture to the at least one energy extraction device.

* * * * *